US012646909B2

(12) United States Patent
Yan et al.

(10) Patent No.: US 12,646,909 B2
(45) Date of Patent: Jun. 2, 2026

(54) SWITCHGEAR

(71) Applicant: ABB SCHWEIZ AG, Baden (CH)

(72) Inventors: Congming Yan, Xiamen (CN); Zicheng Liang, Xiamen (CN); Liqun Huang, Xiamen (CN); Xingjie Chen, Xiamen (CN)

(73) Assignee: ABB Schweiz AG, Baden (CH)

( * ) Notice: Subject to any disclaimer, the term of this patent is extended or adjusted under 35 U.S.C. 154(b) by 284 days.

(21) Appl. No.: 18/583,052

(22) Filed: Feb. 21, 2024

(65) Prior Publication Data

US 2024/0356315 A1 Oct. 24, 2024

(30) Foreign Application Priority Data

Apr. 23, 2023 (CN) .......................... 202310443704.5

(51) Int. Cl.
*H02B 13/035* (2006.01)

(52) U.S. Cl.
CPC ................................ *H02B 13/0352* (2013.01)

(58) Field of Classification Search
CPC .... H01H 31/003; H01H 31/32; H01H 33/022; H01H 31/02; H01H 33/42; H01H 33/6606; H01H 1/36; H01H 1/5822; H01H 3/32; H01H 31/08; H01H 31/10; H02H 7/22; H02B 13/0352
See application file for complete search history.

(56) References Cited

U.S. PATENT DOCUMENTS

| | | | | |
|---|---|---|---|---|
| 4,215,256 A | * | 7/1980 | Sakaguchi | H02B 1/22 218/82 |
| 5,294,761 A | * | 3/1994 | Okutomi | H01H 33/66207 218/130 |
| 2007/0261946 A1 | * | 11/2007 | Yu | H01H 3/264 200/48 R |
| 2008/0049383 A1 | * | 2/2008 | Fukunaga | H02B 13/075 361/612 |
| 2009/0266695 A1 | | 10/2009 | Bickel et al. | |

(Continued)

FOREIGN PATENT DOCUMENTS

| | | |
|---|---|---|
| CN | 217406037 U | 9/2022 |
| DE | 1135983 B | 9/1962 |

(Continued)

*Primary Examiner* — Michael A Matey
(74) *Attorney, Agent, or Firm* — Greenberg Traurig, LLP

(57) ABSTRACT

A switchgear which includes at least one three-position disconnector arranged in a gas-tight space of a frame. Each phase of the disconnector includes first, second, and third fixed contacts and a moving contact. The first fixed contact is directly connected to a main busbar, so that the conductive main circuit has shorter wiring, saving floor space, and conductor materials. An outer surface of the moving contact is provided with a slot extending in an axial direction to accommodate rolling elements, which guide the moving contact to move through the second fixed contact and prevent it from rotating. The moving contact is provided with grooves, which accommodate contact pieces to realize connection with the corresponding fixed contact. The moving contact of each disconnector is coupled to the same drive shaft so that it is connected to an external operating mechanism via only one sealing point on the frame.

15 Claims, 18 Drawing Sheets

(56) References Cited

U.S. PATENT DOCUMENTS

| | | | |
|---|---|---|---|
| 2013/0032575 A1* | 2/2013 | Kuhl .................... | H01H 31/003 |
| | | | 218/78 |
| 2013/0075368 A1* | 3/2013 | Marchand ............ | H01H 33/662 |
| | | | 218/140 |
| 2020/0083000 A1* | 3/2020 | Bianco .................... | H01H 9/30 |

FOREIGN PATENT DOCUMENTS

| | | | |
|---|---|---|---|
| DE | 102006033209 B3 | 11/2007 |
| EP | 0348645 A2 | 1/1990 |
| EP | 1585157 A1 | 10/2005 |

* cited by examiner

250

204

250

220

250

234

236

208

236

204

250

220

SWITCHGEAR

CROSS-REFERENCE TO RELATED APPLICATIONS

This application claims priority to Chinese patent application Serial No.: 202310443704.5, filed on Apr. 23, 2023, which is herein incorporated by reference in its entirety.

FIELD

The present disclosure relates to a switchgear, and more particularly, to an isolation
switchgear for various power systems.

BACKGROUND

In power systems, switchgear includes combinations of disconnectors and fuses or circuit breakers that are used to control, protect, and isolate electrical equipment. A disconnector is a switch that operates when there is no current flowing in the power system and usually does not have an arc extinguishing device. That is, opening and closing operations of the disconnector are performed when no current flows in a circuit. The disconnector is mainly used to isolate the power supply and to maintain the circuit in the absence of load current.

Disconnectors are widely used in industrial applications, power distribution, and other applications. A common type of existing disconnector is the three-position disconnector. The three-position disconnector is commonly used in gas-insulated switchgear (GIS) and has three operating positions or phases: a closing position where the main break of the disconnector is connected, an opening position where the main break is separated, and an earthing position on the earthing side. Regardless of whether it is a high-voltage, medium-voltage or low-voltage type of disconnector, the layout and structural design of its different phases and other components have an important influence on the effective space utilization of switchgear, accurate control of contact action, isolation effect, gas sealing effect, equipment cost, and so on.

SUMMARY

Embodiments of the present disclosure provide a switchgear to solve the problems underlying the above-described aspects.

According to an aspect of the present invention, there is provided a switchgear comprising: a frame forming a gas-tight space therein; a main busbar arranged inside the frame, which may include a single phase, two phases, or three phases; and at least one three-position disconnector arranged inside the gas-tight space. The at least one three-position disconnector includes a single phase, two phases or three phases corresponding to the main busbar, and each phase is configured to include a first fixed contact, a second fixed contact, a third fixed contact, and a moving contact.

The first fixed contact is also referred to as the isolating fixed contact and the third fixed contact is also referred to as the earthing fixed contact, according to the function achieved. In addition, the moving contact is capable of moving in the arrangement direction of the three fixed contacts and can be configured to connect the first fixed contact and the second fixed contact so that the three-position disconnector is in an isolating-on position, to disconnect the first fixed contact and the second fixed contact so that the three-position disconnector is in an isolating-off position, to connect the second fixed contact and the third fixed contact so that the three-position disconnector is in an earthing position, and to disconnect the second fixed contact and the third fixed contact so that the three-position disconnector is in an earthing-off position.

In the frame, the first fixed contact is directly connected to the main busbar, the first fixed contact and the third fixed contact may be disposed at two sides of the second fixed contact, respectively, and the first fixed contact, the second fixed contact, the third fixed contact and the moving contact may be arranged coaxially and successively along an axial direction so as to lie in the same plane as the main busbar. This arrangement, in particular the arrangement in which the first fixed contact is directly connected to the main busbar, enables the electrically conductive main circuit in the switchgear to have the shortest possible connection wiring, thereby saving floor space and conductor material. This provides a more compact and miniaturized structure, and ensures better dielectric properties.

In some embodiments, the moving contact may be configured to move through the second fixed contact. An outer surface of the moving contact is provided with at least one first slot extending in the axial direction, which is configured to accommodate at least one rolling element to guide movement of the moving contact through the second fixed contact and to prevent rotation of the moving contact relative to the second fixed contact.

In some embodiments, the rolling elements may comprise, for example, balls or rollers. The use of the rolling elements reduces the mating friction between the moving contact and the fixed contact, facilitates the guidance of the moving contact and facilitates the assembly of components.

In some embodiments, an inner surface of the second fixed contact is provided with at least one second slot extending in the axial direction so as to mate with the at least one first slot of the moving contact to form a channel, and the at least one rolling element is accommodated in the channel jointly formed by the first slot and the second slot.

In some embodiments, the moving contact is provided with a groove around the outer surface thereof to accommodate an elastic contact piece mating with the groove. The groove may be an annular or other type of groove, such as a single continuous groove around the outer surface of the moving contact, or a plurality of grooves that are spaced apart. The elastic contact piece may be one or more annular contact pieces that mate with the annular groove and are correspondingly arranged. The annular contact pieces are configured to provide contact between the moving contact and each of the fixed contacts for electrically conductive connection or disconnection. Such an arrangement of grooves on the moving contact to accommodate the contact pieces can minimize the number of contact pieces required for the contacts, thereby achieving a simpler and more compact contact structure for the contacts.

In some embodiments, the annular contact may comprise, for example, a spiral spring or a strap contact finger.

In some embodiments, the moving contact is provided at both axial ends with at least one annular groove and a corresponding annular elastic contact piece.

In some embodiments, the annular grooves are provided in pairs at both axial ends of the moving contact and accommodate the corresponding annular elastic contact pieces.

In some embodiments, the number of annular grooves and corresponding annular elastic contact pieces provided on the moving contact per phase of the three-position disconnector may be from 2 to 6, for example, 4. Thus, for a three-phase switchgear there may be a total of from 6 to 18 annular grooves and corresponding annular elastic contact pieces. In the case of using 4 annular grooves and annular elastic contact pieces per phase, the three-phase switchgear has only 12 annular grooves and annular elastic contact pieces. Through the arrangement of the annular groove and the annular elastic contact piece, the number of contact pieces required between the moving contact and the fixed contacts can be reduced, which further reduces friction and simplifies the structure of the contacts while ensuring sufficient contact.

In some embodiments, the switchgear comprises a spindle. The spindle may be configured to drive the moving contact to disconnect or connect the first fixed contact from or to the second fixed contact, or to connect or disconnect the second fixed contact to or from the third fixed contact.

In some embodiments, the spindle is a screw rod. An inner surface of the moving contact is provided with threads for mating with the screw rod.

In some embodiments, the switchgear further comprises an operating mechanism mounted externally of the frame. The operating mechanism comprises a drive shaft. The drive shaft is mounted to a support structure of the frame and is coupled to the spindle of the moving contact via a direction changing device to drive movement of the moving contact.

In some embodiments, the direction changing is achieved by a bevel gear structure. For example, the direction changing device comprises a first bevel gear and a second bevel gear, and the drive shaft is mounted with the first bevel gear, and an end of the spindle is mounted with a second bevel gear meshing with the first bevel gear.

In some embodiments, the direction changing is achieved by a worm gear structure, for example, the direction changing device is a worm gear structure. The worm forms at least a portion of the drive shaft, and the end of the spindle is mounted with a worm wheel meshing with the worm.

In some embodiments, the moving contacts of the single phase, two phases or three phases are respectively coupled to the drive shaft via the direction changing device by the spindle, so that the operating mechanism can simultaneously drive the moving contact of each of the single phase, two phases or three phases of the three-position disconnector. Since the moving contacts of the single phase, two phases or three phases of the three-position disconnector are only driven by the same drive shaft, the drive shaft is only connected to an external drive mechanism via a single sealing point on the frame, thereby reducing the number of required drive shafts. Moreover, since the number of dynamic sealing points is reduced, this simplifies the structure of the switchgear, reduces the risk of gas leakage due to the movement of the drive shaft and the like, improves the sealing performance of the switchgear, and reduces the cost.

In some embodiments, an end of the first fixed contact, the second fixed contact and the third fixed contact of each three-position disconnector is provided with a shielding covering matching with the shape of the respective contacts. The shielding covering is configured, for example, as a structure having an arc-shaped curved surface. By providing the shielding cover on the fixed contacts, the distance between the various phases can be further shortened while discharges or shorts are effectively avoided, thereby enabling to provide a more compact phase layout. In addition, the structure with an arc-shaped curved surface can make the shielding cover itself to minimize adverse effect such as discharge or abnormal insulation caused by the tip.

In some examples, the shielding cover can be a separate component from the fixed contact or can be integrated with the fixed contact.

In some embodiments, the second fixed contact of each three-position disconnector may be fixed to the frame via a separate connection piece, such as through a connection piece to a bushing of a circuit breaker. The connection piece comprises, for example, a rod or other suitable form of structure. In some examples, the connection piece may, via an arc-shaped surface, mate at its end with an arc-shaped interface of the second fixed contact. By virtue of the smooth transition between the arc-shaped surface and the arc-shaped interface potential insulating problems associated with sharp edges are avoided. Moreover, since the connection piece and the second fixed contact adopt a separate structure, the structure of each component is simplified, the high manufacturing cost of the original integrally formed member (e.g., a T-shaped member) is avoided, the material is saved, and the installation is easy. It should be understood that the mating between other components may also adopt an arc-shaped transition structure. In some examples, the first fixed contact may, via an arc-shaped surface, mate at an end with an arc-shaped interface of the main busbar. In other examples, the third fixed contact may, via an arc-shaped surface, mate at an end with an arc-shaped interface of the support structure at the bottom of the frame.

In some embodiments, the gas-tight space is filled with an insulating gas. The insulating gas is, for example, dry air, nitrogen, and/or sulfur hexafluoride.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent the same components.

FIGS. 2A to 2C illustrate a switchgear and disconnector therein according to some embodiments of the present disclosure, in which FIG. 2A illustrates a partial perspective view of the switchgear with the disconnector, FIG. 2B illustrates a partial front view of the switchgear, and FIG. 2C illustrates a partial side view of the switchgear;

FIGS. 3A to 3C illustrate a disconnector and a transmission mechanism thereof in a switchgear according to some embodiments of the present disclosure, in which FIG. 3A illustrates a perspective view of the disconnector and the transmission mechanism thereof, FIG. 3B illustrates a perspective view of a direction changing device of the transmission mechanism, and FIG. 3C illustrates a side view of the direction changing device;

FIGS. 4A to 4F illustrate a contact structure of a disconnector in a switchgear according to some embodiments of the present disclosure, in which
FIG. 4A illustrates a front view of the contact structure,
FIG. 4B illustrates a detailed view of a moving contact and a moving manner thereof,
FIG. 4C illustrates a detailed view of the moving contact and 5
6 fixed contacts,
FIG. 4D illustrates a detailed sectional view of the moving contact assembled in the fixed contacts,
FIG. 4E illustrates a perspective view of the moving contact assembled in the fixed contacts,
and FIG. 4F illustrates an exploded view of the assembly of the moving contact and the fixed contacts.

DETAILED DESCRIPTION

Figure 1A:
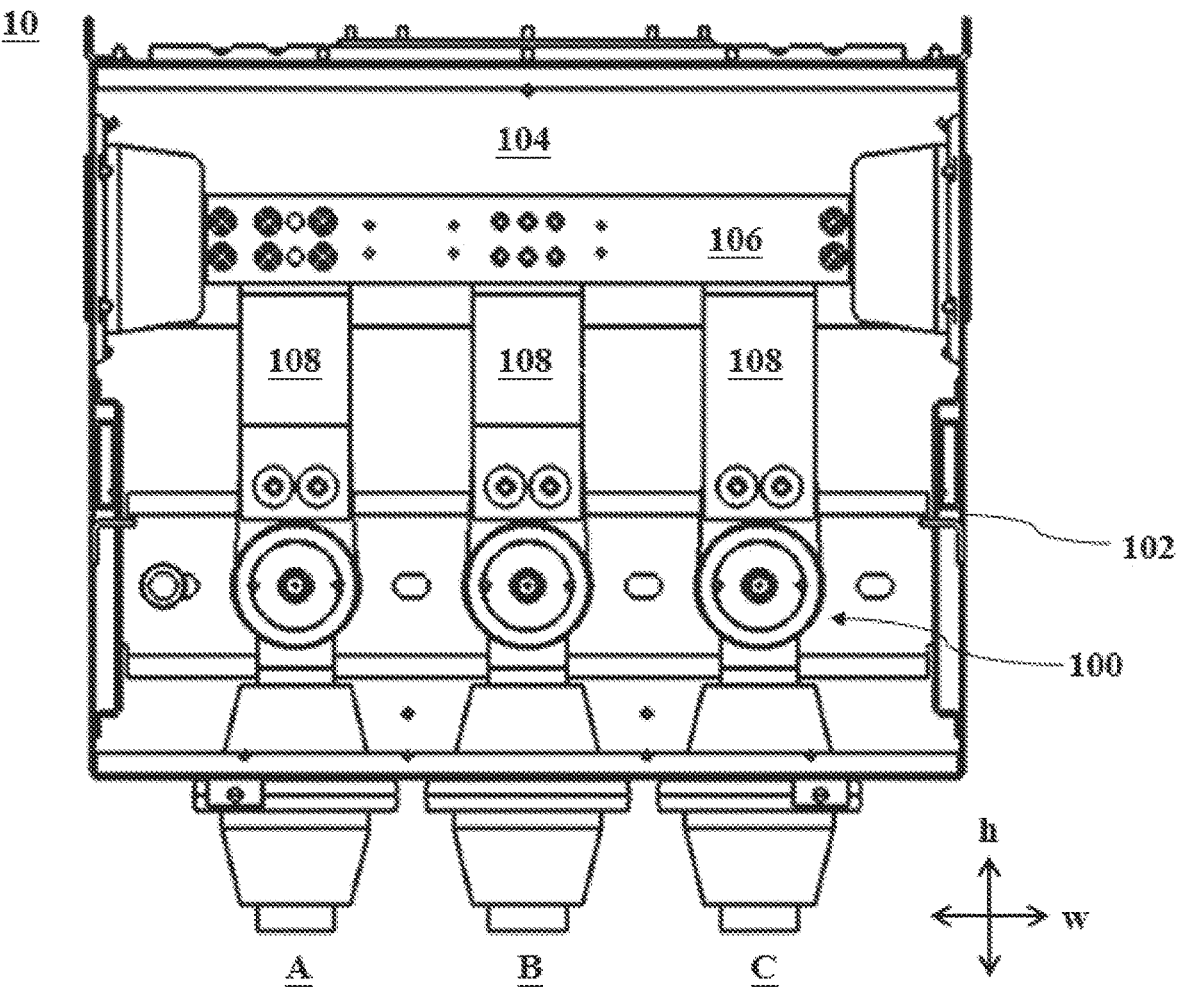
FIGS. 1A to 1E illustrate a related switchgear and its disconnector.

The principle of the present disclosure will now be discussed with reference to several example embodiments as shown in the accompany drawings. It is to be understood these embodiments are discussed only for the purpose of enabling those skilled persons in the art to better understand and thus implement the present disclosure, rather than suggesting any limitations on the scope of the present disclosure.

As used herein, the term "comprises" and its variants are to be read as open terms that mean "comprises, but is not limited to." Unless expressly stated, the term "or" is to be read as "and/or." The term "based on" is to be read as "based at least in part on." The term "one embodiment" and "an embodiment" are to be read as "at least one embodiment." The term "another embodiment" is to be read as "at least one other embodiment." The terms "first," "second," "third," and the like may refer to different or same objects. Other definitions, explicit and implicit, may be comprised hereinafter. A definition of a term is consistent throughout the description unless the context clearly indicates otherwise.

In the disclosure below, when reference is made to modifiers absolute (such as the terms "front", "back", "top", "bottom", "left", "right", and the like) or to modifiers relative (such as the terms "above", "below", "higher", "lower", and the like), or to modifiers of orientation (such as "horizontal", "vertical", and the like), the orientation is referred to as shown in the figures, unless expressly indicated otherwise. The expressions "about", "approximately", "basically" and "roughly" are expressed within 10%, preferably within 5%, unless otherwise specified.

As described above, a switchgear is a combination of disconnectors and fuses or circuit breakers used to control, protect, and isolate electrical equipment. The switchgear is used to de-energize equipment to allow work to be completed and/or to clear downstream faults. This type of equipment is important because it has a direct impact on the reliability of the electric power supply. With the development of society and economy, the complexity of engineering construction increases and the customers have higher and higher requirements for the miniaturization, maintenance free, intelligentization of switchgear.

A conventional GIS typically comprises high voltage components such as circuit breaker, disconnector, earthing switch, busbar (including main busbar and branch busbar, etc.), current transformer, voltage transformer, lightning arrester, etc. The GIS is usually a fully-enclosed cabinet-type structure filled with insulating gas, so as to seal the components such as busbars, circuit breakers and disconnectors in a frame structure of the cabinet to prevent said components from interference of environmental factors (such as altitude, humidity, corrosion, etc.), especially to reduce electromagnetic interference, thereby reducing maintenance workload and repair time. However, the closed structure of GIS may be eroded by the outside environment, or there are some factors such as poor sealing, which will bring a series of problems such as water intrusion, gas leakage and so on. In addition, for different application occasions, GIS also needs miniaturization to meet the requirements of different floor area and space constraints.

Therefore, the structure of GIS needs to be simplified to meet the application requirements under different environmental conditions while ensuring good sealing. Under this background, it is necessary to optimize the layout and the design of the whole structure of the components and elements in the switchgear, further improve the sealing structure to reduce the risk of gas leakage, and still ensure the good isolation effect of the disconnector while realizing the miniaturization.

In order to solve the above and other potential problems, example embodiments of the present disclosure propose an improved switchgear. The disconnector may be arranged as an integrated module in the switchgear. In some embodiments, the disconnector may be a three-position disconnector used in various types of GISs. In the following, the concept of the present disclosure will be described using a three-position disconnector as an example.

Figure 1B:
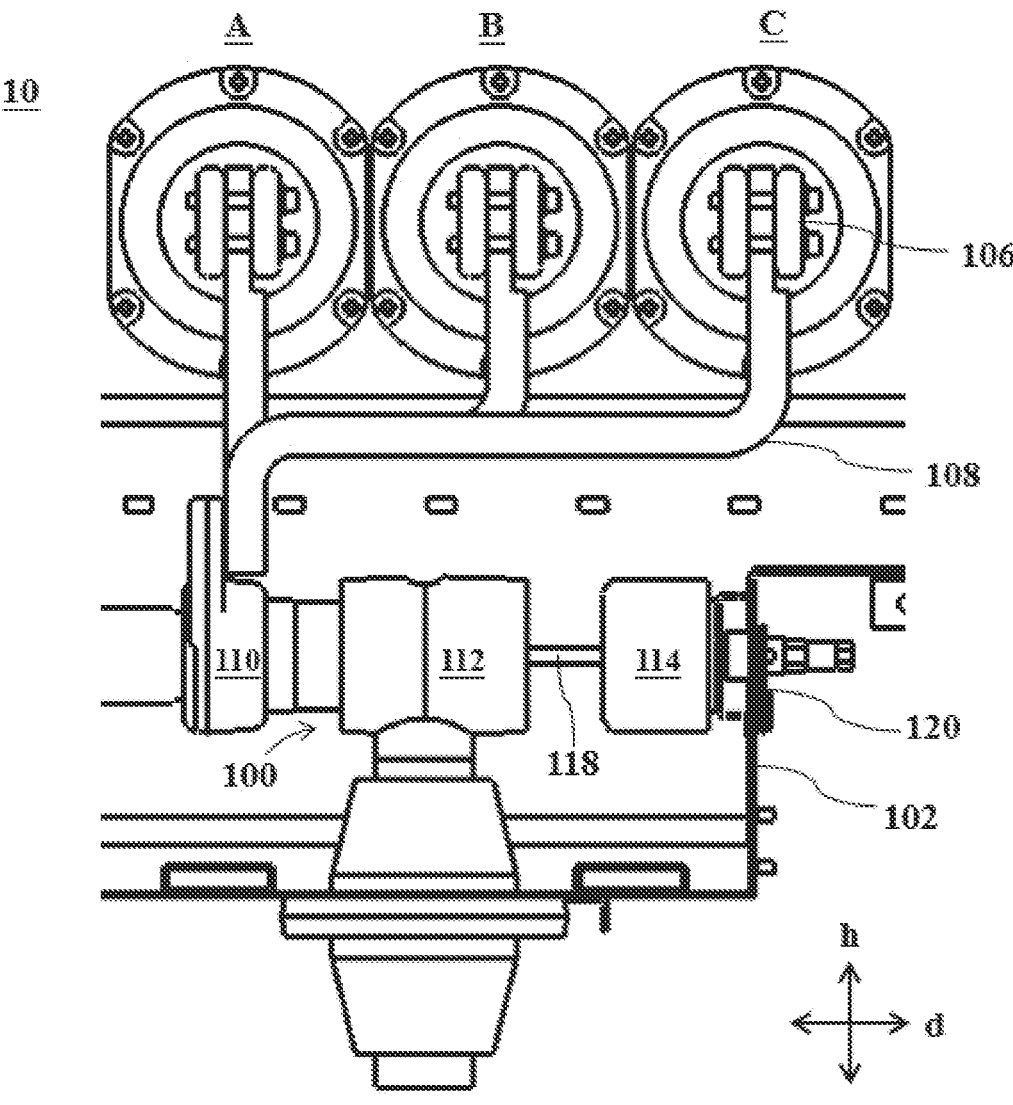
Figure 1C:
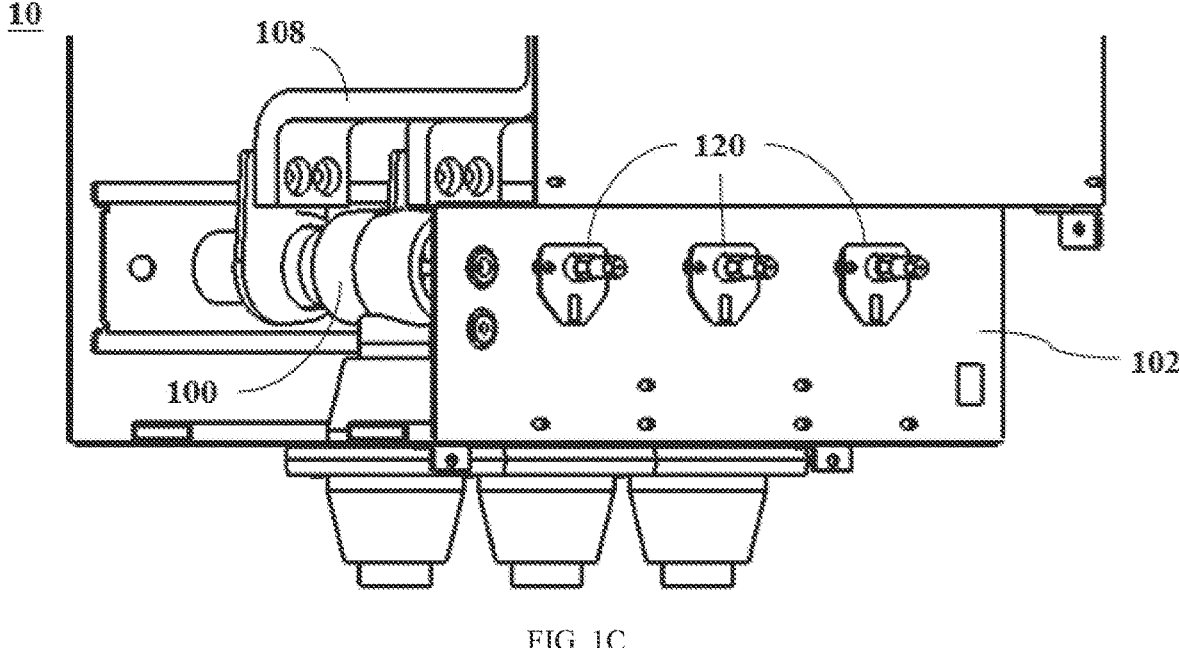

FIGS. 1A to 1E illustrate a related gas insulated switchgear (GIS) 10 and a three-position disconnector 100 therein, wherein FIG. 1A is a partial front view of the switchgear 10 (e.g., facing an operation panel of the switchgear), FIG. 1B is a partial side view of the switchgear 10, and FIG. 1C is a partial perspective view of the switchgear 10. The GIS 10 has a cabinet structure, also known as a switch cabinet. As shown in FIGS. 1A to 1C, the disconnector 100 is mounted on a frame 102 at the top of the switch cabinet. The frame 102 defines a gas-tight space 104 therein for accommodating the disconnector 100 and associated components, such as busbars and circuit breakers. As shown in FIG. 1A, a main busbar 106 extends in a horizontal widthwise direction w of the switch cabinet (i.e., from left to right parallel to the plane of the drawing as shown) and is disposed on top of the frame 102. As shown in FIG. 1B, the main busbar 106 has three phases A, B, C arranged side by side on the frame 102 in a horizontal depth direction d of the switch cabinet (i.e., perpendicular to the plane of the drawing as shown in FIG. 1A, or parallel to the plane of the drawing from left to right as shown in FIG. 1B). The three-position disconnector 100 is arranged under the main busbar 106 with the axial direction of the fixed contacts 110, 112, 114 and the moving contact 116 perpendicular to the direction of extension of the main busbar 106. The main busbar 106 is connected to three disconnectors 100 via three branch busbars or copper conductors 108, respectively.

In this arrangement of the switchgear 10, the disconnector 100 has three phases corresponding to the main busbar 106. As described above, the three phases A, B, C are arranged in sequence along the horizontal depth direction d of the switch cabinet, that is, the extending direction of the contacts of the disconnector 100 is staggered by 90 degrees from the extending direction of the main busbar 106. In order to couple the disconnector 100 to the main busbar 106, three branch busbars or copper conductors 108 are led respectively from the main busbar to be connected to the fixed contact 110 of each phase of the disconnector 100. The moving contact 116 of the disconnector 100 is movable in the horizontal depth direction d in order to connect to or disconnect from the fixed contact in the three switching positions, respectively. Since the main busbar 106 is connected to the fixed contact of the disconnector via a branch busbar or a copper conductor 108, the resulting conductive loop is relatively long, which increases the risk of affecting the desired dielectric properties. Furthermore, the spacing of the three phases from each other is relatively small due to the spatial constraints in the depth direction. This also affects the disconnection or isolating effect of the disconnector.

As shown in FIGS. 1B and 1C, the moving contact 116 of each phase of the disconnector 100 is driven via a screw rod 118, and each of the screw rods 118 is connected to a corresponding operating mechanism outside the frame 102. In other words, three screw rods 118 are required to be connected to the frame 102, respectively. Therefore, three interfaces 120 are required to be provided at the corresponding positions of the frame 102 to allow the three screw rods 118 to pass therethrough. Therefore, in order to ensure the gas-tightness of the frame interior, the three interfaces 120 need to be sealed, forming three dynamic sealing points, so as to avoid the problem of gas leakage due to the movement of the screw rods 118 and the like. However, the existence of multiple dynamic sealing points still increases the possibility of gas leakage, which has an impact on the sealing performance of the switchgear.

Figure 1D:
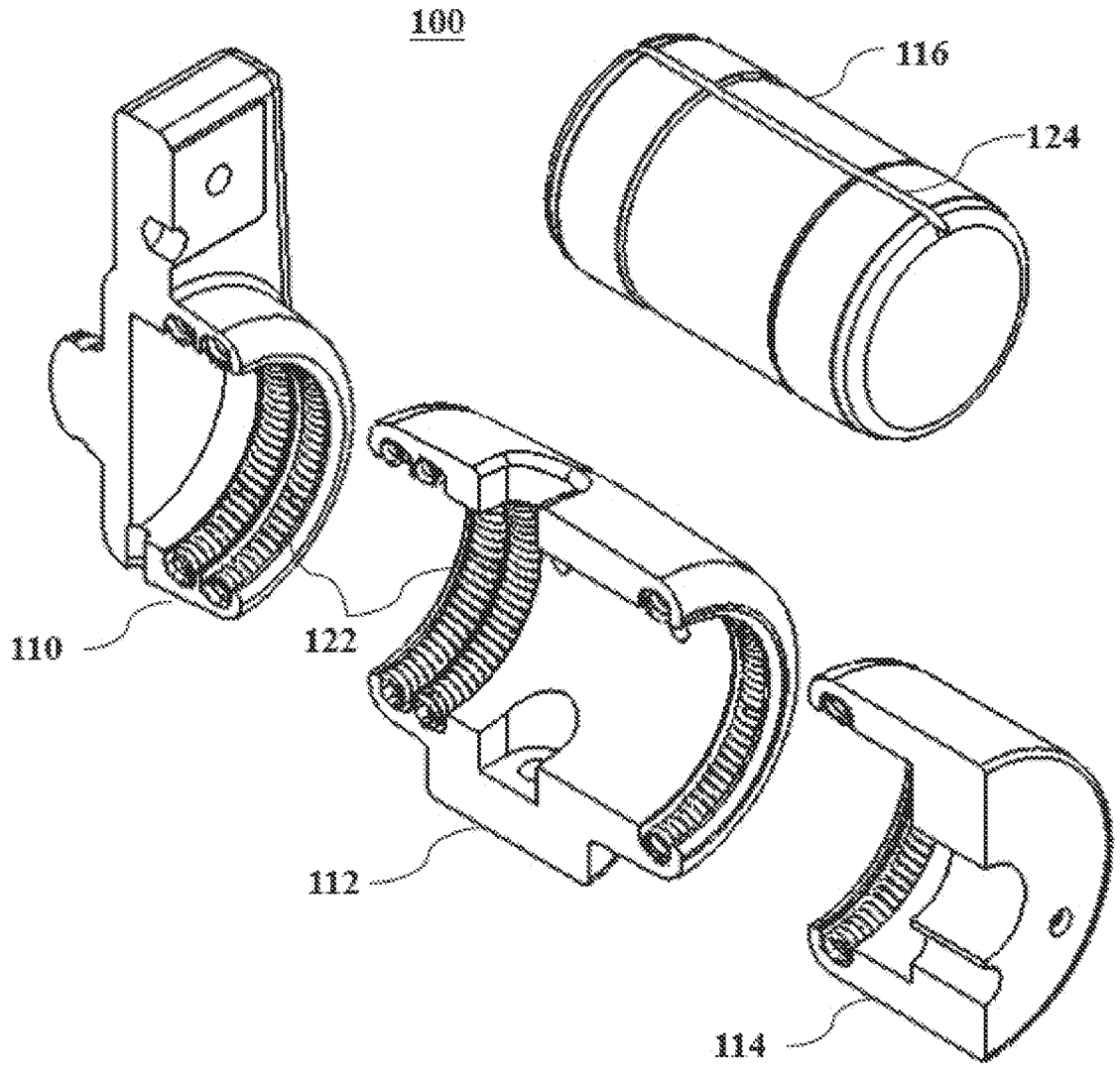
Figure 1E:
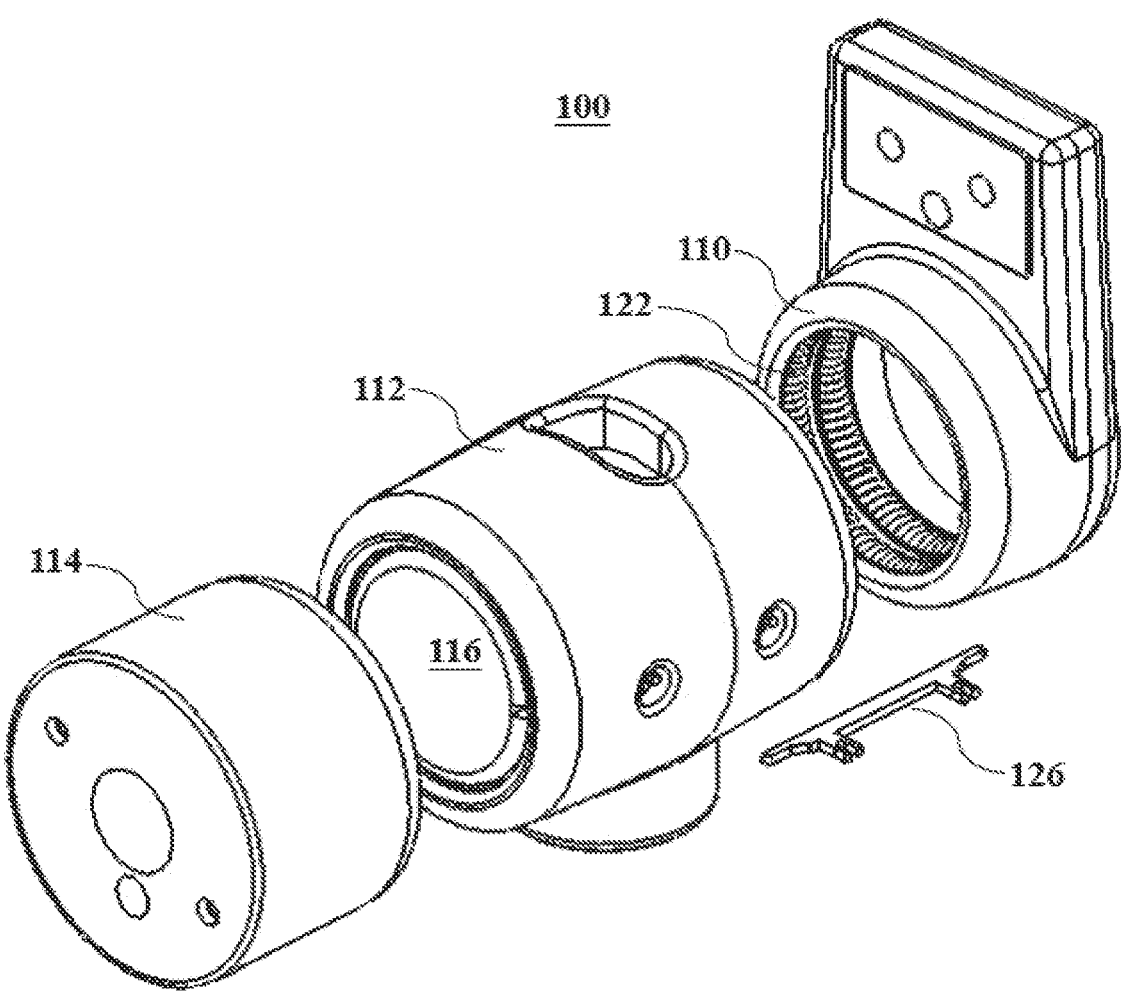

In addition, as shown in the exploded perspective views of FIG. 1D and FIG. 1E, in the construction of the disconnector 100, the moving contact 116 has a cylindrical structure. The fixed contacts 110, 112, 114 have, at respective portions, a cylindrical structure that mates with the moving contact 116. The connection or contact between the moving contact 116 and the fixed contacts is achieved by means of metal contact pieces 122. The metal contact pieces 122 are arranged in the interior of the respective fixed contacts 110, 112, 114 in the form of spiral springs. In order to meet the contacting requirements, in a three-phase switchgear 10 it is usually necessary for up to 24 spiral springs 122 to be mounted in the respective fixed contacts of the three phases. Furthermore, in order to ensure sufficient contact of the moving contact 116 with the fixed contacts 110, 112, 114, it is necessary for the moving contact 116 to be provided with a slideway 124 in the axial direction thereof to accommodate an anti-rotation device 126.

The anti-rotation means 126 is in the form of an elongated sheet having projections at both ends thereof, whereby, when received in the slideway 124 of the moving contact 116, the moving contact 116 is prevented from rotating with the screw rod 118 during driving of the screw rod. Although this structure enables the contact of the moving contact with the fixed contact to be achieved, the structure is relatively complicated, and the number of required parts (particularly, the number of spiral springs) is large, thereby causing problems such as increased frictional fit between the parts, difficulty in mounting the parts, and high cost.

Figure 2A:
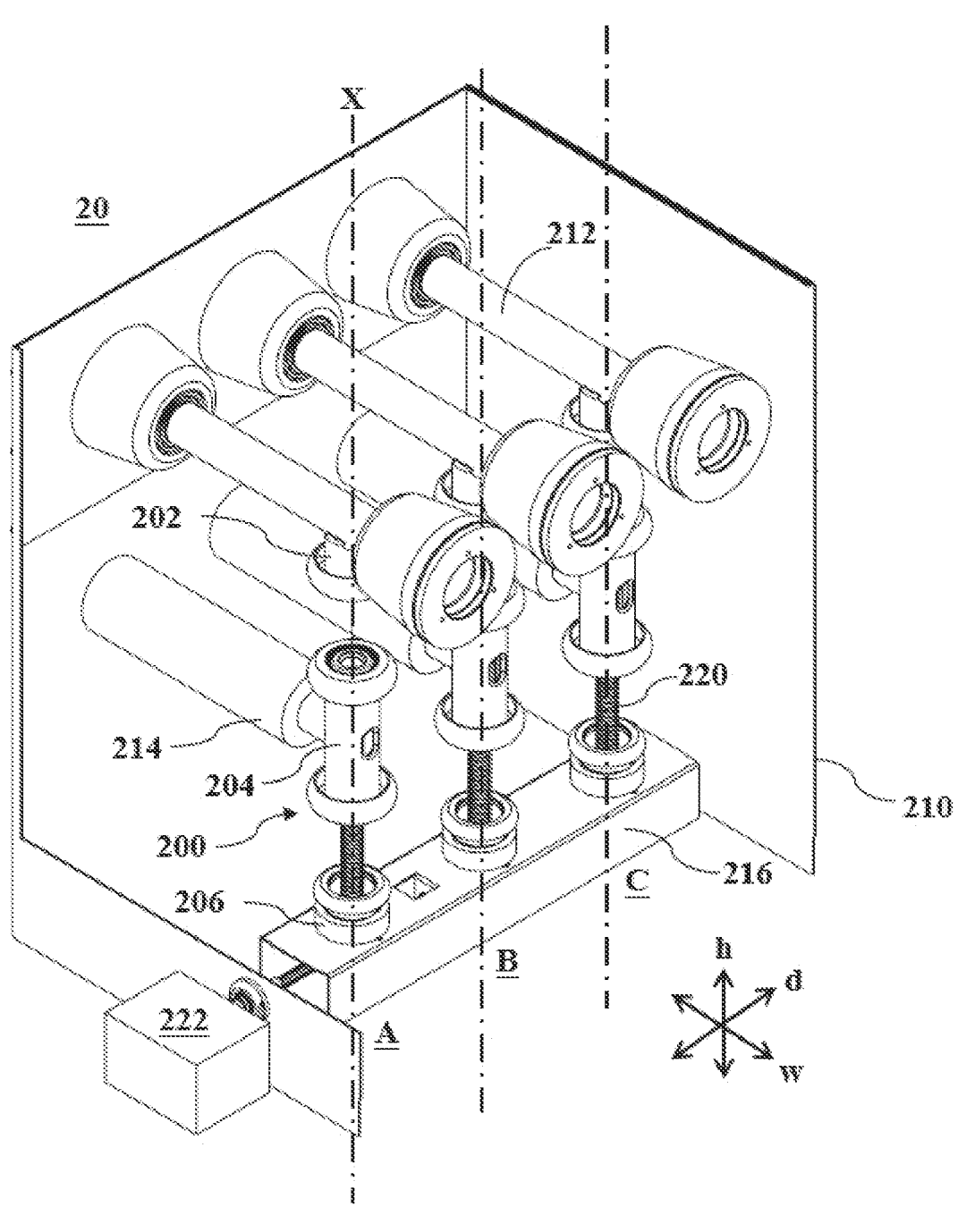
Figure 2B:
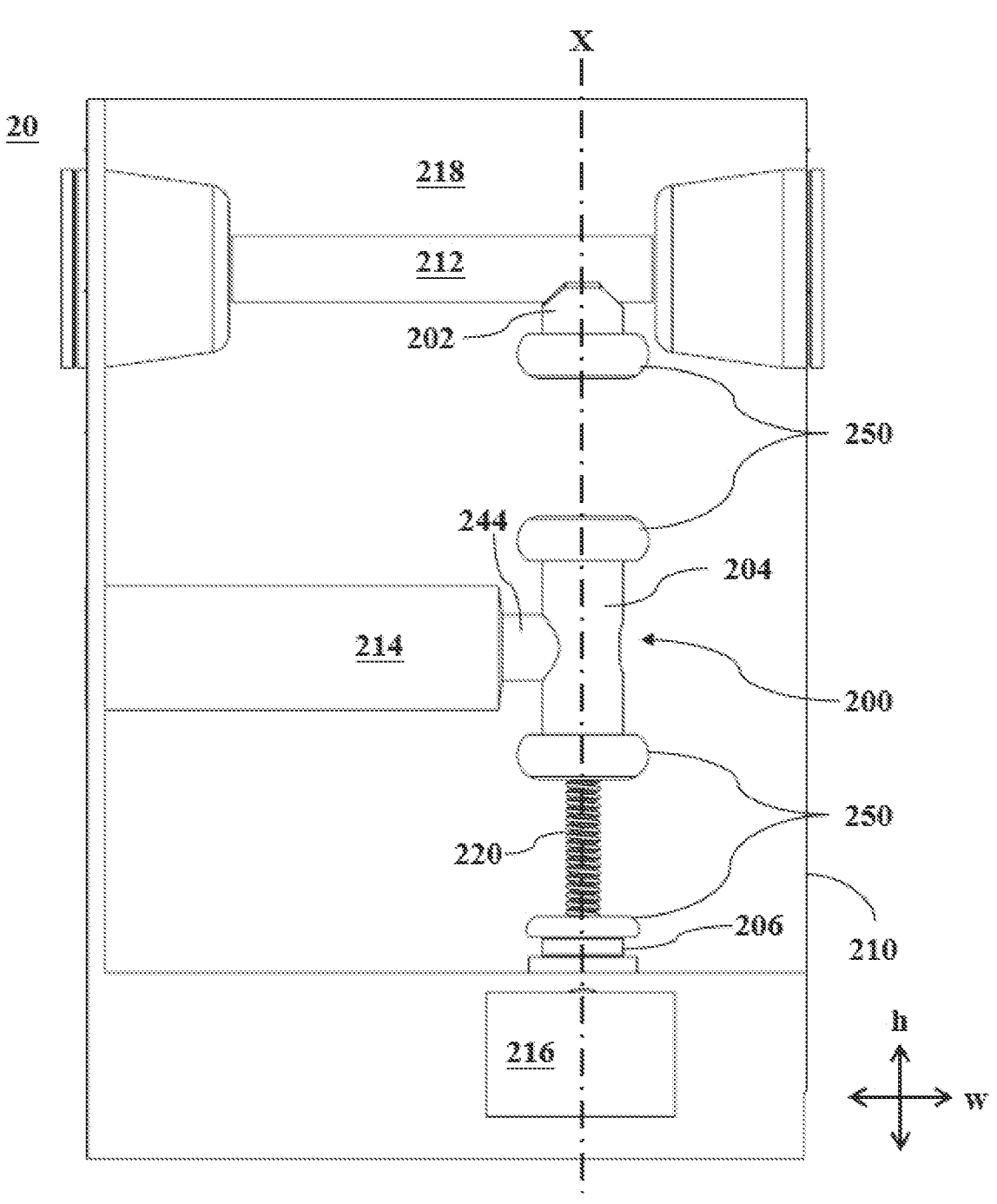
Figure 2C:
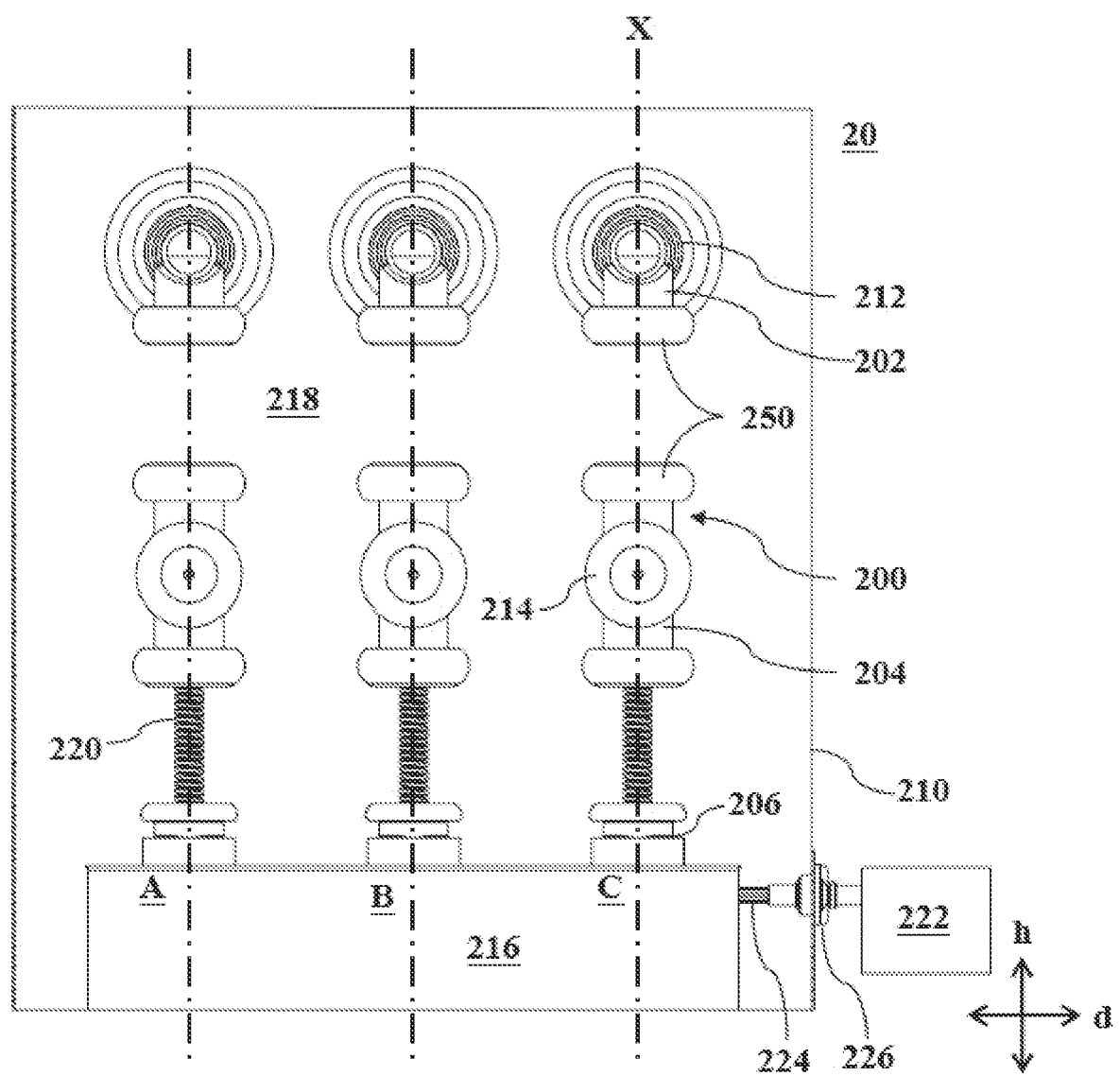

In accordance with an aspect of the present disclosure, in some embodiments, an example switchgear 20 and three-position disconnectors 200 thereof are illustrated in FIGS. 2A to 2C, where FIG. 2A is a partial perspective view of the switchgear 20, FIG. 2B is a partial front view of the switchgear 20 (e.g., facing an operating panel of the switchgear), and FIG. 2C is a partial side view of the switchgear 20. Each phase of the three-position disconnector 200 includes a first fixed contact 202, a second fixed contact 204, a third fixed contact 206, and a moving contact 208. The moving contact 208 is adapted to fit in a first fixed contact 202 (also referred to as an isolation fixed contact), a second fixed contact 204, and a third fixed contact 206 (also referred to as an earthing fixed contact), and is configured to: connect the first fixed contact 202 and the second fixed contact 204 to place the three-position disconnector 200 in an isolating-on position; disconnect the first fixed contact 202 and the second fixed contact 204 to place the three-position disconnector 200 in an isolating-off position; connect the second fixed contact 204 and the third fixed contact 206 to place the three-position disconnector 200 in an earthing position; or disconnect the second fixed contact and the third fixed contact to place the three-position disconnector 200 in an earthing-off position.

The switchgear 20 is, for example, a two-phase or three-phase isolation switchgear for use with electrical equipment such as switch cabinets, or may, for example, be a single-phase switchgear in some applications. Accordingly, a main busbar 212 may comprise a single phase, two phases, or three phases, and at least one three-position disconnector 200 comprises a single phase, two phases, or three phases corresponding to the main busbar 212. In the example embodiment shown in FIGS. 2A to FIG. 2C, the switchgear 20 is a three-phase switchgear. The switchgear 20 includes a frame 210, and the three-position disconnectors 200 are provided in the frame 210 such that the three phases A, B, and C of the three-position disconnectors 200 are arranged in sequence along a horizontal depth direction d (i.e., a direction perpendicular to the plane as shown in FIG. 2B or a direction parallel to the plane from left to right as shown in FIG. 2C) of the switchgear 20. The main busbar 212 extending along the horizontal width direction w as shown in FIG. 2B is mounted inside the frame 210, for example above the disconnector 200. In the illustrated example frame structure, the first fixed contact 202 of the disconnector 200 is directly connected to the main busbar 212. The first fixed contact 202 and the third fixed contact 206 may be respectively disposed on both sides of the second fixed contact 204, and the first fixed contact 202, the second fixed contact 204, the third fixed contact 206 and the moving contact 208 are coaxially arranged in sequence along an axial direction X (as shown in FIGS. 2B and 2C in the vertical direction h) so as to be located in the same plane as the main busbar 212.

In embodiments of the present disclosure, the fixed contacts 202 at the closing position of the disconnector 200 are all directly connected to the main busbar 212, thereby eliminating the need for additional branch busbars or other copper conductors. This allows the conductive main circuit of the disconnector to have the shortest possible connecting wiring, thereby saving space and conductor material. Furthermore, since the switchgear 20 has sufficient space in the vertical direction, lining up the three fixed contacts of the disconnector 200 along the vertical direction allows the disconnector 200 to take up less space in the horizontal width direction and in the horizontal depth direction and does not interfere with the arrangement of the respective electrical components along the vertical direction. In particular, in the horizontal width direction (as shown in FIG. 2B), the arrangement of the present disclosure enables the switchgear to be reduced from a typical width of 900-1000 mm to a width of about 800 mm, thereby providing a more compact and miniaturized structure.

Furthermore, compared to a two-phase or three-phase arrangement along the horizontal width direction, in embodiments of the present disclosure, the two-phase or three-phase arrangement of the disconnector 200 along the horizontal depth direction results in these phases being more widely spaced from each other, thereby miniaturizing the GIS while still meeting the phase spacing requirements of the disconnector. Accordingly, the solution of the present disclosure ensures better dielectric properties. It should be appreciated that the arrangement of the main busbar 212 and the at least one three-position disconnector 200 in the frame 210 may vary depending on the specific application and is not limited to the examples shown in FIGS. 2A to 2C. For example, the main busbar 212 may be provided at the bottom of the frame 210 and the three-position disconnector 200 is provided at the top of the frame or other suitable location, as long as the first fixed contact 202 of the three-position disconnector 200 is directly connected to the main busbar 212, and the first fixed contact 202, the second fixed contact 204, the third fixed contact 206, and the moving contact 208 are coaxially arranged in sequence along the axial direction X to be located in the same plane as the main busbar 212.

According to another aspect of the present disclosure, in some embodiments, the switchgear 20 comprises a frame 210 for mounting various electrical components. The frame 210 forms a box or cabinet of the switchgear and forms a closed structure, thereby forming a gas-tight space inside the frame. The gas-tight space 218 of the switchgear 20 is filled with an insulating gas. The insulating gas should have excellent insulating properties, arc extinguishing properties, and stability properties. For example, the insulating gas may be dry air, nitrogen ($N_2$) and/or sulfur hexafluoride ($SF_6$), or a mixture thereof.

In some embodiments, the disconnector 200 is mounted in the gas-tight space 218, for example, at the top of the frame 210. As noted above, any other mounting location of the disconnector 200 in the frame 210 is also suitable, as long as the space of the frame 210 is dimensioned to accommodate two or three phases of the disconnector 200 lined up in a particular direction. In the gas-tight space 218, the main busbar 212 extends, for example, in a horizontal direction and is mounted on the frame 210. In addition, other desired electrical components may be mounted in or outside of the gas-tight space 218 as desired. For example, a circuit breaker may be connected to the second fixed contact 204 of the disconnector 200 through a connection piece 244 via a bushing 214.

In some embodiments, as shown in FIGS. 2A to 2C, the first fixed contact 202 of each disconnector 200 is directly connected to the main busbar 212 at the top, the second fixed contact 204 is connected to the bushing 214 of the circuit breaker at an intermediate position via the connection piece 244, and the third fixed contact 206 is provided on a support structure 216 at the bottom.

Figure 5A:
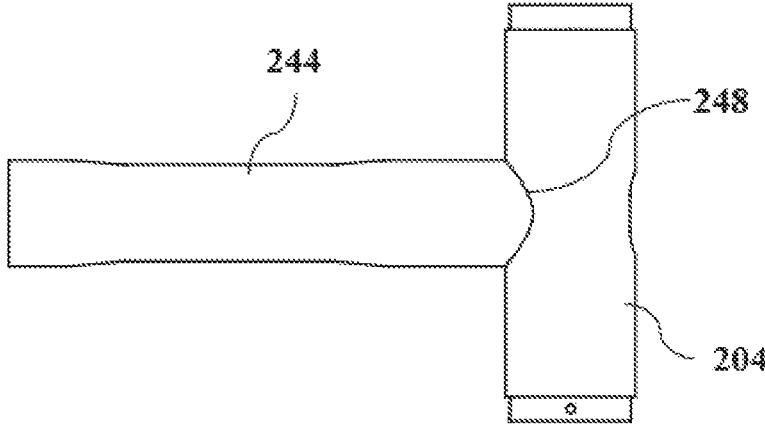
FIGS. 5A to 5B illustrate side and perspective views, respectively, of a second fixed contact of a disconnector and its connection piece in a switchgear according to some embodiments of the present disclosure.
Figure 5B:
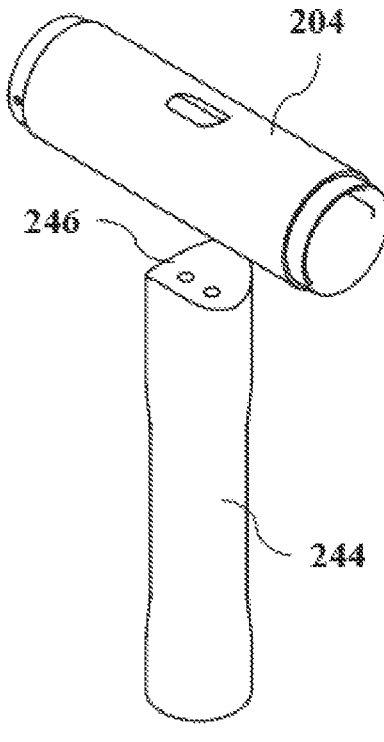

In other embodiments, the second fixed contact 204 of each disconnector 200 may be fixed to the frame 210 via a separate connection piece 244, e.g., to the bushing 214 secured to the frame 210, as shown in FIG. 2B. Additionally, as shown in FIGS. 5A to 5B, the connection piece 244 is mounted to the second fixed contact 204 in an appropriate manner. For example, the connection piece 244 may be assembled on the second fixed contact 204 in a direction perpendicular to the second fixed contact 204, thereby forming a T-shaped structure. It should be appreciated that the connection piece 244 is also capable of being mounted on the second fixed contact 204 at an angle.

In some embodiments, the connection piece 244 includes, for example, a rod or other suitable form of structure. In some examples, the connection piece 244 may, via an arc-shaped surface 246, mate at its end with an arc-shaped interface 248 of the second fixed contact 204. With the smooth transition between the arc-shaped surface 246 and the arc-shaped interface 248, potential insulation problems due to sharp edges are avoided. Moreover, since the connection piece 244 and the second fixed contact 204 are of a split structure, the structure of the individual parts is simplified, avoiding the high processing cost of the original one-piece molded part (e.g., the T-shaped second fixed contact 112 shown in FIGS. 1B, 1D, and 1E), saving material, and being easy to install. It should be understood that the fit between other parts may also adopt the structure of art-shaped transition. In some examples, the first fixed contact 202 may, via an arc-shaped surface, mate at an end with an art-shaped interface of the main busbar. In other examples, the third fixed contact 206 may, via an arc-shaped surface, mate at an end with an arc-shaped interface of the support structure 216 at the bottom of the frame 210.

According to embodiments of the present disclosure, as shown in FIGS. 2A to 2C, FIGS. 3A to 3C, and FIGS. 4A to 4F, the switchgear 20 comprises a spindle 220. The spindle 220 is capable of driving the moving contact 208 to move (in the vertical direction as shown by the arrow in FIG. 4B) to disconnect or connect the first fixed contact from or to the second fixed contact, or to connect or disconnect the second fixed contact to or from the third fixed contact.

In some embodiments, the spindle 220 is a screw rod and the moving contact 208 is provided with threads on its inner surface that mate with the screw rod so that vertical movement of the moving contact 208 is achieved by the cooperation of the threads and the screw rod.

Figure 3A:
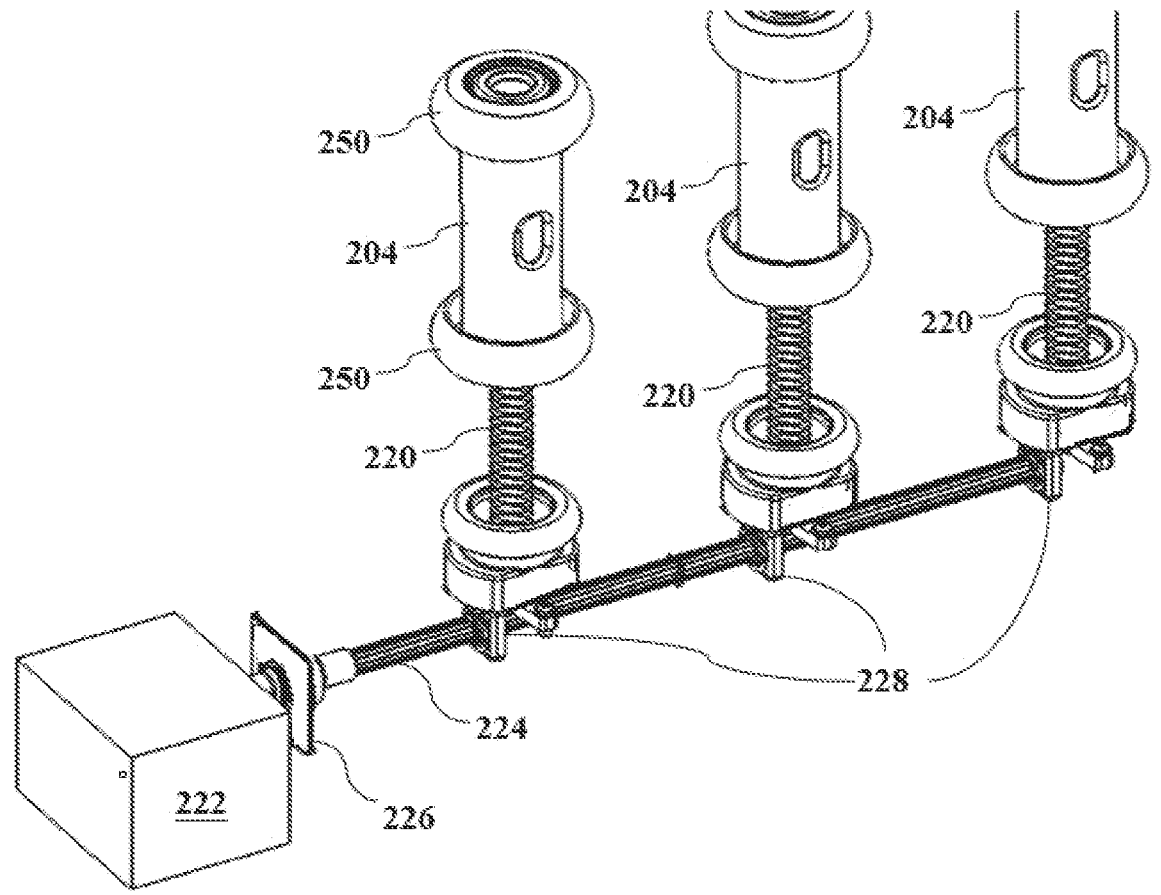

In some embodiments, as shown in FIGS. 2C and 3A, an operating mechanism 222 of the disconnector 200 is mounted on the outside of the frame 210, such as in a control unit chamber located on the side of the frame 210. The operating mechanism 222 has a drive shaft 224. The drive shaft 224 passes through the frame 210 via a sealing structure 226 on the frame 210, and is mounted to the support structure 216 inside the frame 210.

Figure 3B:
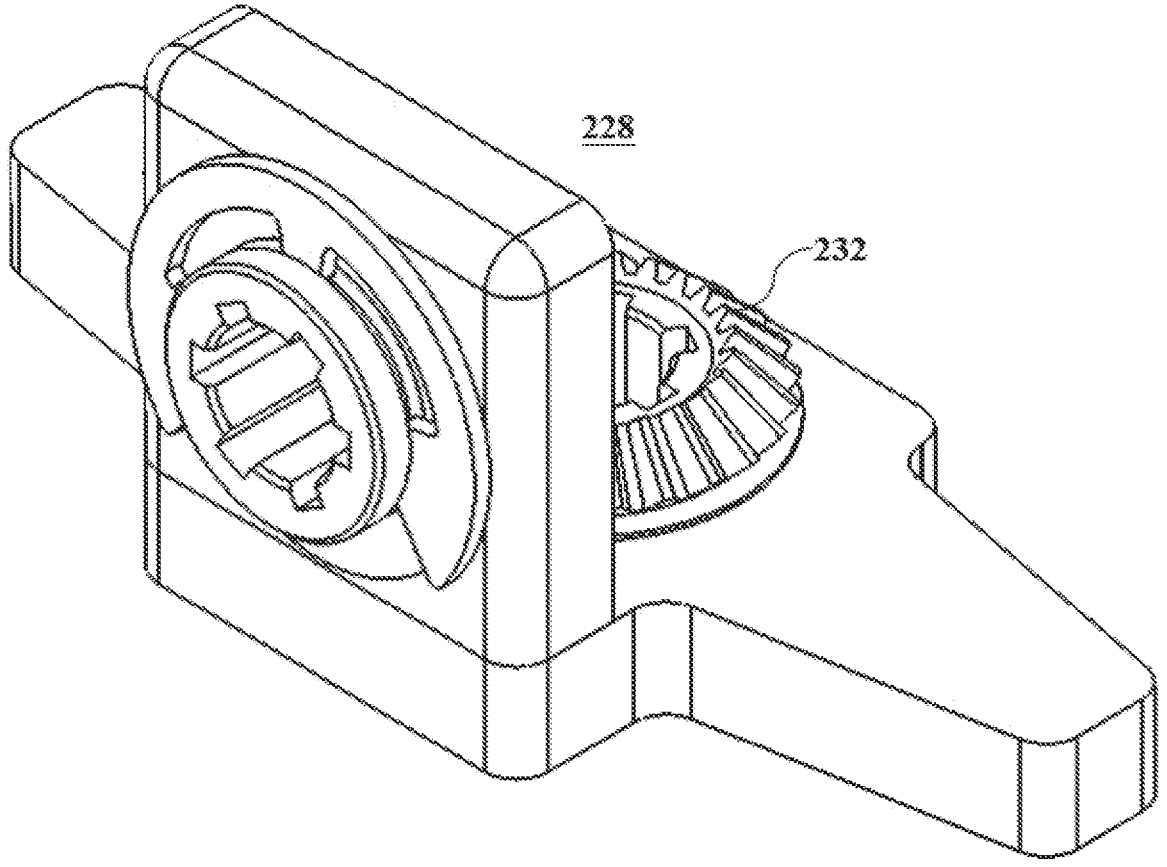
Figure 3C:
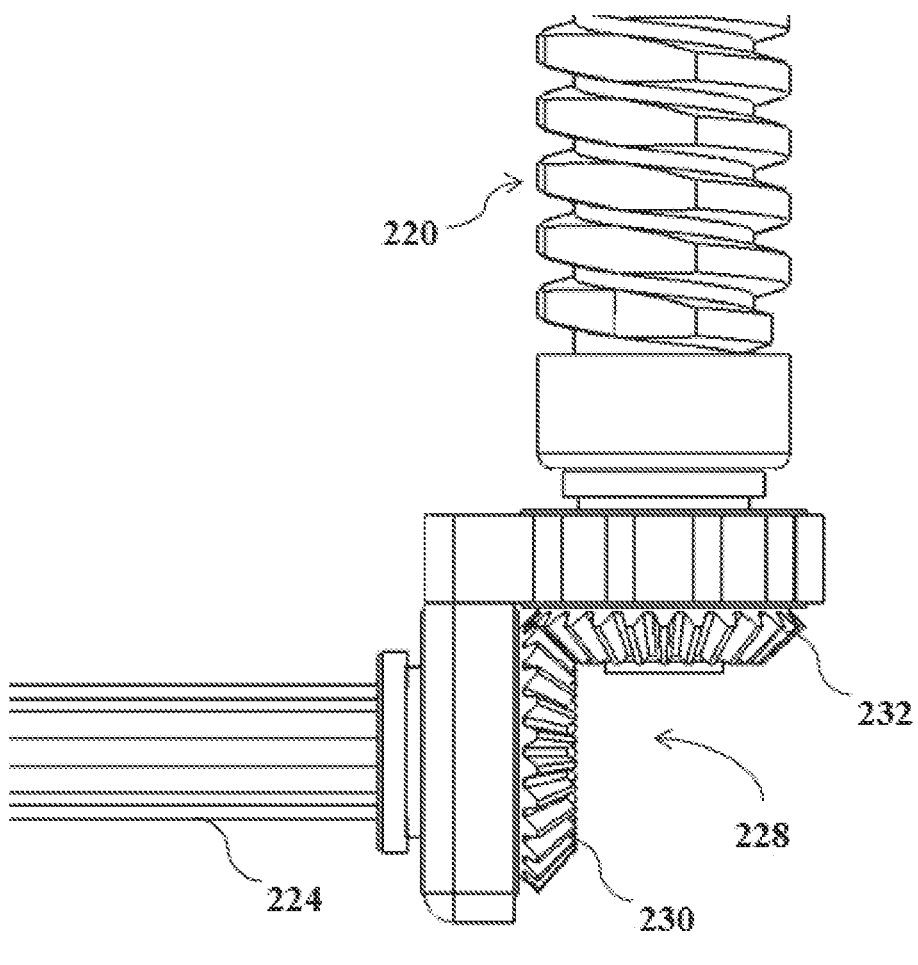

In some embodiments, as shown in FIGS. 3A to 3C, the drive shaft 224 is coupled to the spindle 220 of each disconnector 200 via a direction changing device 228, thereby driving the movement of the moving contact 208. Since the moving contacts 208 of two or three phases (e.g., the three phases illustrated) of the disconnectors 200 located in the gas-tight space 218 are connected to the same drive shaft 224 via the spindles 220 (FIG. 3A), such that only that one drive shaft 224 is connected to the drive mechanism 222 outside of the frame 210. Thus, as compared to having a separate drive shaft for each phase, the solution of the present disclosure reduces the number of required drive shafts.

Furthermore, in embodiments of the present disclosure, the number of dynamic sealing points on the frame 210 is also reduced compared to conventional solutions. For example, the solution of the present disclosure provides only one dynamic sealing point or sealing structure 226 for the drive shaft 224 on the frame 210 compared to the three dynamic sealing points shown in FIG. 1. Thus, the solution of the present disclosure simplifies the structure of the switchgear and minimizes the number of dynamic sealing points, which further reduces the risk of gas leakage due to factors such as the movement of the drive shaft and improves the sealing performance of the switchgear. In addition, this saves on the manufacturing cost of the switchgear due to the overall reduction in the number of components, in particular the reduction in the number of components required for the sealing structure.

In some embodiments, as shown in FIGS. 3A to 3C, the direction changing device 228 between the drive shaft 224 and the moving contacts 208 is a bevel gear structure. Specifically, the bevel gear structure includes a first bevel gear 230 and a second bevel gear 232. The drive shaft 224 has the first bevel gear 230 mounted at an appropriate location in its axial direction, and the spindle 220 of each disconnector 200 has the second bevel gear 232 mounted at an end thereof that engages with the first bevel gear 230. In this way, by means of the bevel gear structure, the driving force along the horizontal direction of the drive shaft 224 is converted into a driving force along the vertical direction, which in turn drives the moving contact 208 to move along the vertical direction. It will be appreciated that other appropriate direction changing devices are also suitable. For example, the drive shaft 224 and the spindle 220 may be coupled to each other by means of a direction changing device in a worm gear structure (not shown). A worm in the worm gear structure may form at least part of the drive shaft, and a worm wheel engaged with the worm is mounted at the end of the spindle 220 of each disconnector 200. In this way, the worm gear structure allows the driving force along the horizontal direction of the drive shaft 224 to be converted into a driving force along the vertical direction, which in turn drives the moving contact 208 to move in the vertical direction.

As described above, the two-phase or three-phase moving contacts 208 in the switchgear 20 are respectively coupled to the drive shaft 224 through the spindle 220 via the direction changing device 228, so that the drive shaft 224 of the same operating mechanism 222 is able to drive the moving contact 208 of each phase of the two-phase or three-phase of the disconnector 200 at the same time. Compared with the conventional solution, this simplifies the transmission structure of the disconnector and achieves a better effect of synchronously driving the moving contacts.

According to another aspect of the present disclosure, in some embodiments, as shown in FIGS. 4A to 4F, the contact connection between the moving contact 208 and the fixed contacts 202, 204, 206 is realized by means of contact pieces 234 mounted on the moving contact 208. Specifically, the moving contact 208 may be provided with at least one groove 236. In some embodiments, at least one groove 236 is provided at two axial ends of the moving contact 208. A plurality of grooves 236 may be provided, for example, in pairs, at the two axial ends. The grooves 236 are used to accommodate the contact pieces 234. Compared to designs in which the contact pieces are mounted in each fixed contact, the embodiments of the present disclosure provide the contact pieces 234 only on the moving contact 208, thereby minimizing the number of contact pieces and achieving a simpler and more compact contact structure.

In some embodiments, as shown in FIGS. 4A to FIG. 4F, the groove 236 may be an annular groove formed around an outer surface of the moving contact 208. Accordingly, the contact piece 234 may be an annular elastic contact piece that matches the annular groove. In one example, the annular elastic contact piece is formed as a spiral spring or strap contact finger, thereby providing sufficient contact between the moving contact 208 and the fixed contacts 202, 204, 206.

In one example, the number of annular grooves and corresponding annular elastic contact pieces (e.g., spiral springs or strap contact fingers) provided on the moving contact 208 for each phase of the disconnector 200 may be from 2 to 6, for example may be 4. Thus, for a three-phase switchgear, a total of 6 to 18 annular grooves and corresponding annular elastic contact pieces may be provided. In case 4 annular grooves and annular elastic contact pieces are used per phase, the three-phase switchgear has only 12 annular grooves and annular elastic contact pieces. In the case of grooves and contact pieces arranged on the fixed contacts (e.g., the three fixed contacts shown in FIG. 1) of the disconnector, a total of more than 20 (e.g., 24) contact pieces (e.g., spiral springs) are required. In contrast, the solution of the present disclosure significantly reduces the number of grooves and contact pieces required for the disconnector, thereby reducing manufacturing costs and making assembly of the components simpler. Furthermore, due to the reduced number of grooves and contact pieces required, the friction due to the relative motion between the moving contact and fixed contacts is correspondingly reduced, thus further improving the transmission efficiency.

Figure 4A:
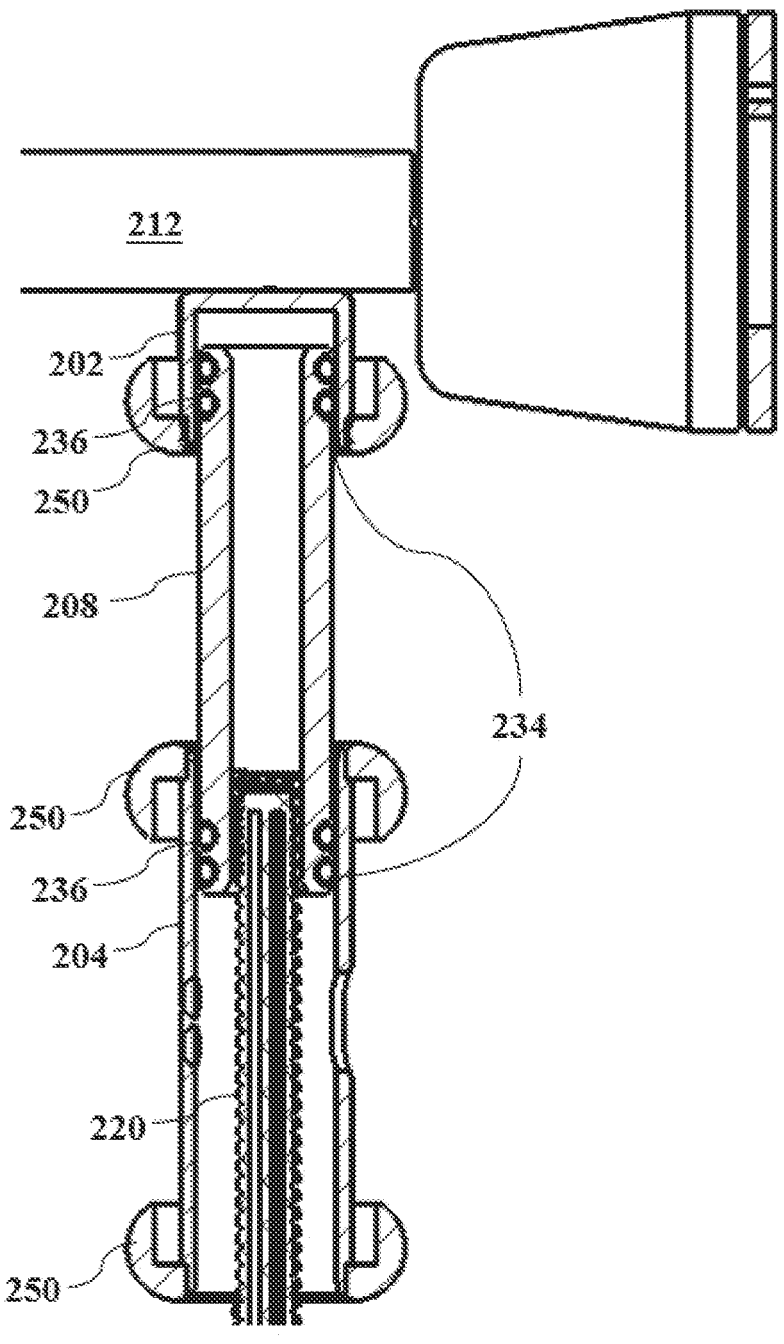
Figure 4B:
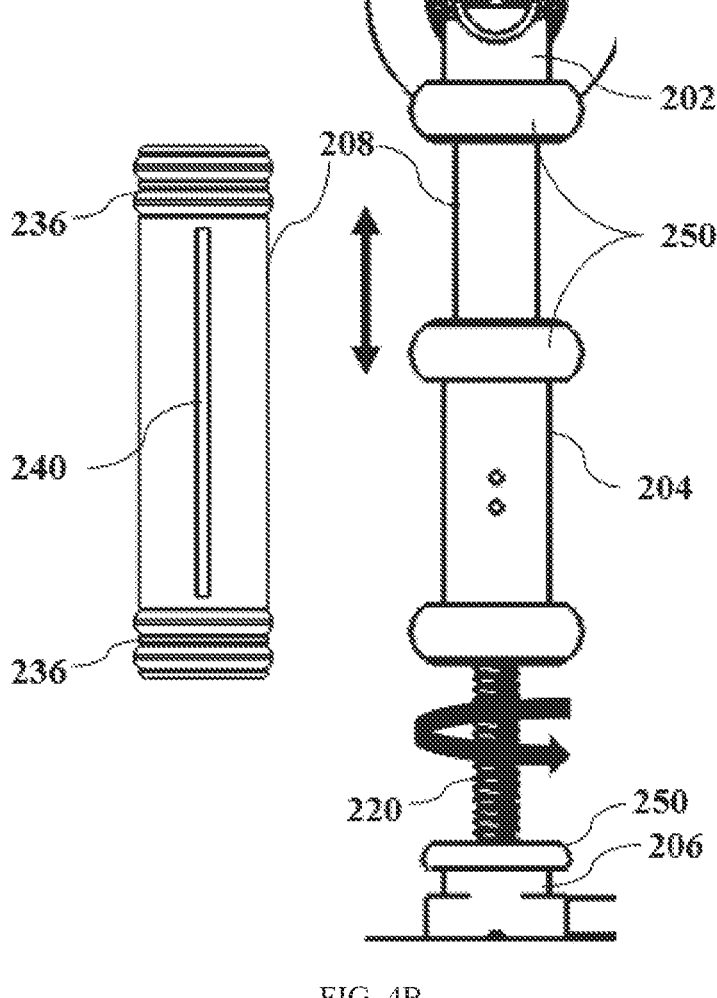
Figure 4C:
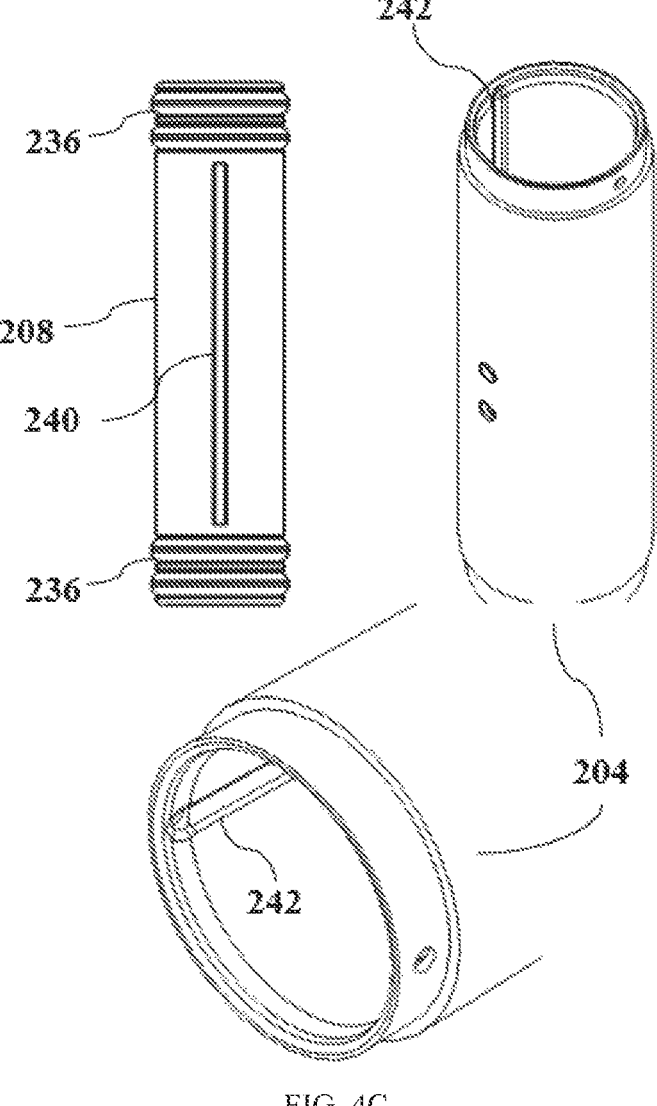
Figure 4D:
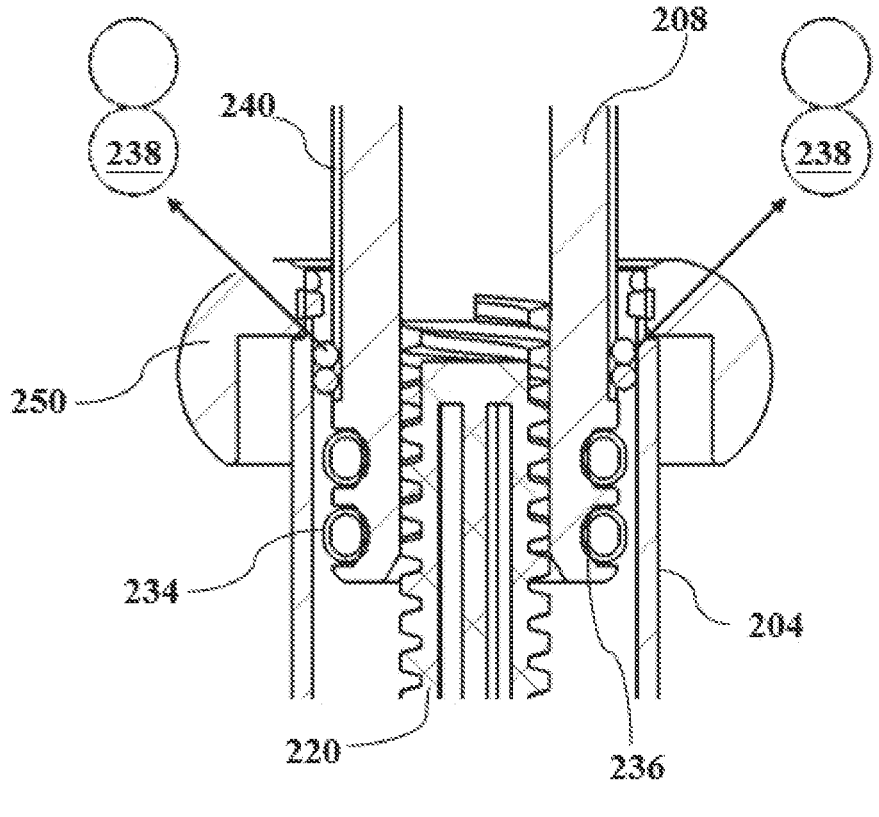
Figure 4E:
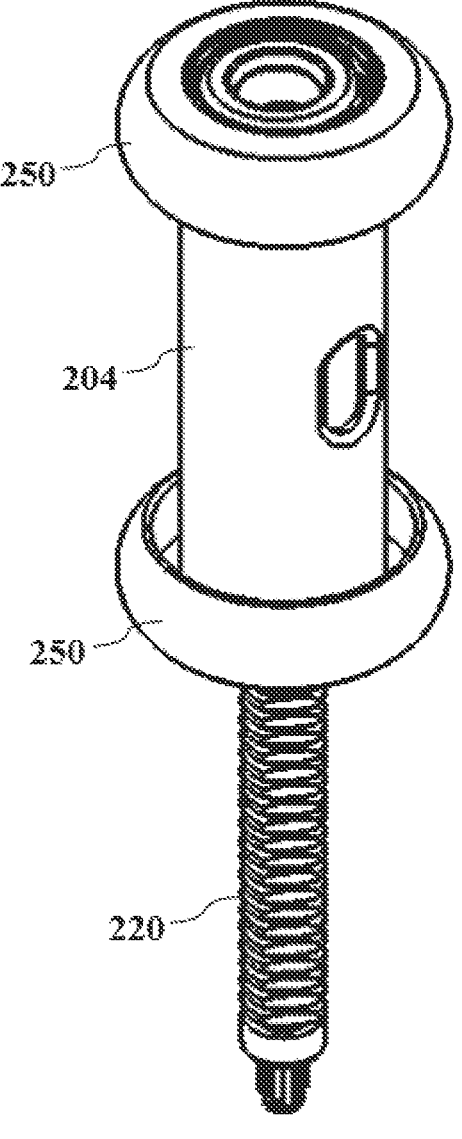
Figure 4F:
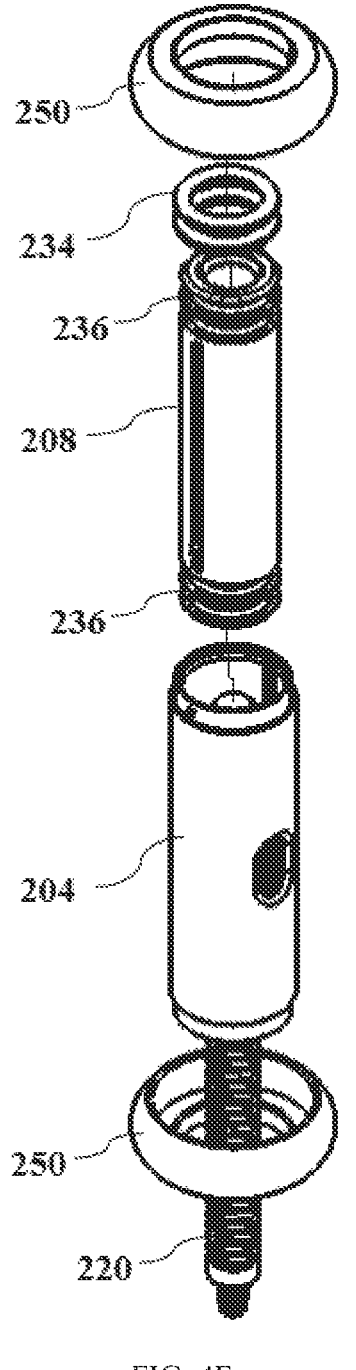

Since the moving contact 208 will generate friction with the fixed contacts under the guidance of the spindle 220, especially with the second fixed contact 204 in the middle, the present disclosure provides, in some embodiments, an anti-rotation device that prevents the moving contact 208 from rotating in the fixed contacts. Specifically, as shown in FIGS. 4B to FIG. 4D, an outer surface of the moving contact 208 may be provided with at least one first slot 240 extending in an axial direction. The first slot 240 may be used to accommodate at least one anti-rotation device in the form of a rolling element 238. The rolling element 238 may help guide the moving contact 208 to move through a fixed contact, such as the second fixed contact 204. As an example, the rolling element 238 may be a ball or roller. The rolling element 238 may move in a vertical direction along the slot 240. Since the rolling element 238 is provided between the moving contact 208 and the fixed contact 204, rotation of the moving contact 208 in a radial direction is restrained, thereby preventing rotation of the moving contact 208 relative to the fixed contact 204. Moreover, since the rolling element 238 is used to realize the fit between the moving contact 208 and the fixed contact 204, this further reduces the friction between the two.

In some embodiments, at least one of the fixed contacts 202, 204, 206 is provided with a slot that matches the moving contact 208. For example, an inner surface of the second fixed contact 204 is provided with at least one second slot 242 extending in an axial direction so as to match the at least one first slot 240 of the moving contact 208. The rolling element 238 may be accommodated in a channel formed by the first slot 240 and the second slot 242 together. As described above, since the rolling element 238 is employed to guide the movement of the moving contact 208 with respect to the fixed contact 204, this reduces friction between the two while providing good guidance. In addition, the fitting structure between the moving contact and fixed contacts of the present disclosure is simpler, requires fewer parts, and is easier to assemble. For example, when a rolling element 238 is used to achieve the fitting, it is easy to install it in the slots 240, 242 of the moving contact 208 or the fixed contact 204, which not only reduces the material cost of the disconnector, but also improves the efficiency of installation of the component.

In some embodiments, an end of the first fixed contact 202, the second fixed contact 204, and the third fixed contact 206 of each disconnector 200 may be provided with a shielding cover 250 that matches the shape of the respective contact, as shown in FIGS. 2B and 3A. As shown in FIGS. 4A to 4F, the shielding cover 250 is configured as a structure having an arc-shaped curved surface. The shielding cover 250 may, for example, be sleeved on an end portion of each fixed contact. By providing the shielding cover 250 on the fixed contact, further shortening of the distance between the respective phases can be effectively avoided in the case of discharges or shorts, thereby enabling a more compact phase layout to be provided. In addition, the use of the structure with an arc-shaped curved surface allows the shielding cover itself to minimize undesirable effects such as discharges or insulation abnormalities due to the tip site. In some examples, the shielding cover 250 may be a separate component from the fixed contact or may be integrally molded with the fixed contact.

The present disclosure provides a switchgear 20 including a disconnector 200 as described above. Utilizing the switchgear 20 and the disconnector 200 according to embodiments of the present disclosure enables the main circuit of the switchgear 20 to be shorter, thereby achieving a more compact and miniaturized structure. Moreover, the disconnector of the embodiments of the present disclosure is able to significantly reduce the risk of gas leakage and obtain better insulation performance. In addition, the present disclosure enables accurate control of contact action, further simplifying the structure and reducing the cost of the equipment while ensuring good isolation and gas sealing effects. In addition, the present disclosure, as described above, further improves the structure or configuration of the components of the switchgear, which makes the layout of the components of the switchgear more compact, and further saves materials and reduces costs.

While the embodiments of the present disclosure have been described above, the above description is illustrative, not exhaustive and is not limited to the disclosed embodiments. Many modifications and alterations will be apparent to those of ordinary skill in the art without departing from the scope and spirit of the illustrated embodiments. The terms used herein are chosen to best explain the principles of the embodiments, the practical application or improvements to the technology on the market, or to enable others of ordinary skill in the art to understand the embodiments disclosed herein.

The invention claimed is:

1. A switchgear, comprising:

a frame forming a gas-tight space therein;

a main busbar, including a single phase, two phases or three phases, arranged inside the frame; and at least one three-position disconnector arranged within the gas-tight space, the at least one three-position disconnector including a single phase, two phases or three phases corresponding to the main busbar, and each phase is configured to:

include a first fixed contact, a second fixed contact, a third fixed contact, and a moving contact;

the moving contact being configured to connect the first fixed contact and the second fixed contact so that the three-position disconnector is in an isolating-on position, to disconnect the first fixed contact and the second fixed contact so that the three-position disconnector is in an isolating-off position, to connect the second fixed contact and the third fixed contact so that the three-position disconnector is in an earthing position, and to disconnect the second fixed contact and the third fixed contact so that the three-position disconnector is in an earthing-off position, wherein the first fixed contact is directly connected to the main busbar, the first fixed contact and the third fixed contact are respectively disposed on both sides of the second fixed contact, and the first fixed contact, the second fixed contact, the third fixed contact, and the moving contact are arranged coaxially and successively along an axial direction so as to lie in the same plane as the main busbar.

2. The switchgear according to claim 1, wherein an outer surface of the moving contact is provided with at least one first slot extending in the axial direction, which is configured to accommodate at least one rolling element to guide movement of the moving contact through the second fixed contact and to prevent rotation of the moving contact relative to the second fixed contact.

3. The switchgear according to claim 2, wherein an inner surface of the second fixed contact is provided with at least one second slot extending in the axial direction, which mates with the at least one first slot of the moving contact to form a channel in which the at least one rolling element is accommodated.

4. The switchgear according to claim 2, wherein the moving contact is provided with a groove around the outer surface the moving contact to accommodate an elastic contact piece mating with the groove.

5. The switchgear according to claim 4, wherein the groove is an annular groove, and the elastic contact piece is an annular elastic contact piece comprising a spiral spring or a strap contact finger.

6. The switchgear according to claim 5, wherein the moving contact is provided at an axial end with at least one annular groove and a corresponding annular elastic contact piece.

7. The switchgear according to claim 6, wherein the annular grooves are provided in pairs at both axial ends of the moving contact to accommodate the corresponding annular elastic contact pieces.

8. The switchgear according to claim 1, comprising a spindle, which drives the moving contact to disconnect or connect the first fixed contact from or to the second fixed contact, or to connect or disconnect the second fixed contact to or from the third fixed contact.

9. The switchgear according to claim 8, further comprising: an operating mechanism mounted externally of the frame and comprising a drive shaft, the drive shaft being mounted to a support structure of the frame and coupled to the spindle via a direction changing device to drive movement of the moving contact.

10. The switchgear according to claim 9, wherein the direction changing device comprises a first bevel gear and a second bevel gear, and the drive shaft is mounted with the first bevel gear, and an end of the spindle is mounted with the second bevel gear meshing with the first bevel gear.

11. The switchgear according to claim 9, wherein the direction changing device comprises a worm gear structure in which a worm forms at least part of the drive shaft and an end of the spindle is mounted with a worm wheel meshing with the worm.

12. The switchgear according to claim 9, wherein the moving contact(s) of the single phase, two phases or three phases are respectively coupled to the drive shaft via the direction changing device by the spindle, so that the operating mechanism is able to simultaneously drive the moving contact of each of the single phase, two phases or three phases of the three-position disconnector.

13. The switchgear according to claim 1, wherein an end of the first fixed contact, the second fixed contact and the third fixed contact of each three-position disconnector is provided with a shielding covering matching with the shape of the respective contacts.

14. The switchgear according to claim 1, wherein the second fixed contact of each three-position disconnector is fixed to the frame via a separate connection piece, and wherein the connection piece, via an arc-shaped surface, mates with an arc-shaped interface of the second fixed contact.

15. The switchgear according to claim 14, wherein the second fixed contact is connected to a bushing of a circuit breaker via the connection piece.

* * * * *